United States Patent
Notaro et al.

(10) Patent No.: US 6,251,164 B1
(45) Date of Patent: Jun. 26, 2001

(54) FLUID SEPARATION PROCESS AND SEPARATION SYSTEM THEREFOR

(75) Inventors: Frank Notaro, Amherst; Jeffert John Nowobilski, Orchard Park; Dariush Habibollih Zadeh, Amherst, all of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/384,219

(22) Filed: Aug. 27, 1999

(51) Int. Cl.[7] ............... B01D 53/047; B01D 53/10
(52) U.S. Cl. ................... 95/99; 95/106; 95/107; 95/115; 95/138; 96/123; 96/128; 96/130
(58) Field of Search .................. 95/95–97, 104, 95/107, 110, 111, 115, 138; 96/123, 126–128, 130, 150

(56) References Cited

U.S. PATENT DOCUMENTS

| | | | |
|---|---|---|---|
| 1,577,534 | * 3/1926 | Miller | 95/107 |
| 2,492,401 | * 12/1949 | Schutte | 95/104 X |
| 2,652,437 | * 9/1953 | Marwil | 95/107 X |
| 2,723,300 | * 11/1955 | Lewis, Jr. | 95/107 X |
| 3,485,014 | * 12/1969 | Atsukawa et al. | 95/110 |
| 3,798,877 | * 3/1974 | Lamb | 95/110 |
| 3,992,176 | * 11/1976 | Bohne et al. | 95/107 |
| 4,061,476 | * 12/1977 | Hölter et al. | 96/150 X |
| 4,191,544 | * 3/1980 | Boll et al. | 96/150 |
| 4,526,877 | 7/1985 | Acharya et al. | 502/60 |
| 4,534,778 | * 8/1985 | Carré et al. | 96/150 |
| 4,800,027 | 1/1989 | BeVier et al. | 252/18 |
| 5,053,210 | 10/1991 | Buxel et al. | 423/239 |
| 5,304,234 | 4/1994 | Takatsuka et al. | 95/106 |
| 5,336,300 | 8/1994 | Yoshino et al. | 95/96 |
| 5,730,003 | 3/1998 | Nguyen et al. | 62/648 |

FOREIGN PATENT DOCUMENTS

| | | | |
|---|---|---|---|
| 529661 A2 | * 3/1993 | (EP) | 95/96 |
| 2076794 | * 12/1981 | (GB) | 96/150 |

\* cited by examiner

Primary Examiner—Robert H. Spitzer
(74) Attorney, Agent, or Firm—Robert J. Follett

(57) ABSTRACT

Separation of one or more fluidic components from a feed fluid containing a plurality of components is accomplished by adsorbent powder entrained in a stream of fluid, such as gas, and preferably is operated as a temperature swing adsorption process using waste thermal energy from a plant.

19 Claims, 5 Drawing Sheets

FLUID SEPARATION PROCESS AND SEPARATION SYSTEM THEREFOR

FIELD OF THE INVENTION

This invention relates to a process and system for selective separation of at least one of a plurality of fluidic components from a stream of feed fluid containing the plurality of fluidic components. More preferably, this invention relates to a gas separation process and system for selective separation of one or more gaseous components from a gas comprising a plurality of gaseous components, wherein the selective separation is accomplished by an adsorbent entrained in a fluid stream.

BACKGROUND OF THE INVENTION

Conventionally known gas separation methods include, for example, (i) chemical absorption, (ii) cryogenic separation, and (iii) adsorption. Although these methods have been widely used, each has merits and demerits.

The chemical absorption method (i) has been used for the removal of hydrogen sulfide or carbon dioxide gas and has also been put to trial use for the desulfurization of exhaust gases. However, this method is defective in that, in the case of using an organic compound as an absorbent, there are problems in treatment of waste fluid, treatment of harmful substances resulting from decomposition of the absorbent, etc. Further, in the case where an acidic gas is treated using a hot aqueous alkali solution as an absorbent, the consumption of heat energy is large.

The cryogenic separation method (ii) has been used, for example, for the separation of air and the separation of hydrocarbon gases such as natural gas. However, this method is disadvantageous in that a large-sized, costly freezing equipment is required. Therefore, practical use of the cryogenic separation method is limited to applications in which separation by the other methods is difficult.

The adsorption method (iii) has been extensively used because it is simple, and the unit used therefor can have a size ranging from small to relatively large. Known types of units for this method include fixed bed type and fluidized bed type.

In adsorption, the amount of a gas adsorbed onto an adsorbent becomes larger with increasing pressure and decreasing temperature, and becomes smaller with reducing pressure and increasing temperature. The adsorption method utilizes this phenomenon in conducting the adsorption step, where a gas is adsorbed onto an adsorbent and the desorption step, where the adsorbed gas is desorbed from the adsorbent. Adsorption separation units of the fixed bed type can utilize the above phenomenon by being provided with a means for changing pressure and temperature. However, in the case of adsorption separation units of the conventional fluidized bed type in which fluidized adsorbent particles circulate in the unit, a pressure difference is rarely utilized in the adsorption-desorption operation. However, a slight pressure is applied as a driving force for circulating the adsorbent particles, and to enable smooth migration of adsorbent particles between the desorption part and the adsorption part. For these reasons, the adsorption-desorption operation in conventional units of the fluidized bed type utilizes a temperature difference only. In the case of adsorption separation units of the fixed bed type, since a larger bed height results in an increased pressure loss, the area of the adsorbent bed should be increased, or the whole unit should be enlarged, in order to heighten treating capacity. However, the possible unit size is limited. Furthermore, size increase of switch valves is also limited.

With a recent increase in the amount of chemical products produced in a single plant in the chemical industry, large amounts of gases need to be treated by gas separation. Therefore, there is a need for an adsorption method capable of coping with such large amounts of gas.

The power consumption in these adsorption processes has been mainly mechanical/electrical type energy. Further, prior art moving bed adsorption processes exhibit an undesirable rate of attrition of the adsorbent particles compared to the fixed and/or stationary bed processes. Additionally, the heat and mass transfer of such processes can be undesirably low. Furthermore, the processes can require an unduly high inventory of expensive adsorbent (particularly as newer sophisticated adsorbents are developed). These and other factors have led to an undesirably high cost of running such prior art processes.

SUMMARY OF THE INVENTION

The object of this invention is to provide improved processes for separation of at least one component from a plurality of components in a feed stream of fluids, such as gas or liquids. For simplicity, the description of the invention hereinafter will generally be in relation to selectively separating at least one component of a plurality of gaseous components in a stream of gas; however, it is to be recognized that the invention is equally applicable to selective separation of components from gases or liquids, but preferably gases.

Another object of this invention is to provide a process and system for selective separation of a gaseous component from a stream of gases using adsorbent powder that primarily can utilize thermal energy, particularly waste thermal energy.

A further object of this invention is to provide a process and system, which can require a reduced inventory of selective adsorbent material and still provide a process and system with improved mass and heat transfer. Yet, another object of this invention is to provide a selective gas separation process and system that can reduce the operational costs of the process and system.

A still further object of this invention is to provide a selective gas separation process and system which can be operated as either a temperature swing absorbent (TSA) process, a pressure swing adsorbent (PSA) process or a combination of the two. An even still further object of the invention is to provide a selective gas separation process and system which can produce high purity gas, such as oxygen, nitrogen or argon gas and the like, and also which can selectively remove environmentally undesirable components from waste gas to be discharged into the atmosphere.

In one aspect, the present invention relates to a selective separation process and system in which adsorbent powder is entrained and suspended in a stream of feed gas of multiple gaseous components to selectively adsorb at least one of the gaseous components from the feed gas stream. In another aspect of this invention, the selective separation process and system employ waste heat as energy to operate the process and system.

In the invention, the term "unloaded adsorbent" means adsorbent which has no gas adsorbed thereon or from which gas has been completely or substantially completely desorbed therefrom.

The present invention comprises a process for selectively removing from a feed gas at least one of a plurality of gaseous components present in a stream of the feed gas, which process comprises:

(a) providing the stream of feed gas at a first temperature;
(b) providing unloaded selective adsorbent powder and entraining said adsorbent powder in the stream of feed gas to provide a mixture of adsorbent powder suspended in the stream of feed gas, said selective adsorbent powder adapted to selectively adsorb at least one of the plurality of gaseous components from the stream of feed gas;
(c) cooling the mixture of the adsorbent suspended in the stream of feed gas to a lower second temperature whereby said selective adsorbent powder selectively adsorbs the at least one of the plurality of gaseous components from the stream of feed gas; separating the adsorbent powder from the cooled suspension of adsorbent in the stream of feed gas to provide:
  (1) separated adsorbent powder having adsorbed thereon the at least one selectively adsorbed gaseous component from the stream of feed gas, and
  (2) as a first gaseous product, a stream of feed gas having selectively removed therefrom the at least one selectively adsorbed gaseous component;
(d) providing a secondary gas stream and introducing the separated adsorbent powder of (c)(1) into the secondary gas stream;
(e) heating the separated adsorbent powder in the secondary gas stream to a third temperature higher than said second temperature to desorb and release from the adsorbent powder the at least one selectively adsorbed gaseous component to provide:
  (1) unloaded adsorbent powder, and
  (2) as a second gaseous product, a stream of the secondary gas containing the at least one selectively adsorbed/desorbed gaseous component from the feed gas stream; and
(f) separating the unloaded adsorbent powder of (e)(1) from the second gaseous product of (e)(2).

A similar process and system using PSA comprises:
(a) providing the stream of feed gas;
(b) providing unloaded selective adsorbent powder and entraining said adsorbent powder in the stream of feed gas to provide a mixture of adsorbent powder suspended in the stream of feed gas, said selective adsorbent powder adapted to selectively adsorb at least one of the plurality of gaseous components from the stream of feed gas;
(c) placing the mixture of the adsorbent powder suspended in the stream of feed gas under an elevated pressure whereby said selective adsorbent powder selectively adsorbs the at least one of the plurality of gaseous components from the stream of feed gas;
(d) separating the adsorbent powder from the cooled suspension of adsorbent in the stream of feed gas to provide:
  (1) separated adsorbent powder having adsorbed thereon the at least one selectively adsorbed gaseous component from the stream of feed gas, and
  (2) as a first gaseous product, a stream of feed gas having selectively removed therefrom the at least one selectively adsorbed gaseous component;
(e) providing a secondary gas stream and introducing the separated adsorbent powder of (d)(1) into the secondary gas stream;
(f) placing the separated adsorbent powder in the secondary gas stream under a reduced pressure to desorb and release from the adsorbent powder the at least one selectively adsorbed gaseous component to provide:
  (1) unloaded adsorbent powder, and
  (2) as a second gaseous product, a stream of the secondary gas containing the at least one selectively adsorbed/desorbed gaseous component from the feed gas stream; and
(g) separating the unloaded adsorbent powder of (f)(1) from the second gaseous product of (f)(2).

The separation system of this invention for selectively removing from a feed gas at least one of a plurality of gaseous components present in a stream of the feed gas comprises:
(a) first conduit means for providing the stream of feed fluid at a first temperature;
(b) dispensing means for providing and dispensing unloaded selective adsorbent powder into the first conduit means for entraining said adsorbent powder in the stream of feed fluid for providing a mixture of adsorbent powder suspended in the stream of feed fluid, said selective adsorbent powder adapted to selectively adsorb at least one of the plurality of fluidic components from the stream of feed fluid;
(c) cooling means for cooling the mixture of the adsorbent powder suspended in the stream of feed fluid to a lower second temperature whereby said selective adsorbent powder can selectively adsorb the at least one of the plurality of fluidic components from the stream of feed fluid;
(d) first separation means for separating the adsorbent powder from the cooled suspension of adsorbent in the stream of feed fluid for providing:
  (1) separated adsorbent powder having adsorbed thereon the at least one selectively adsorbed fluidic component from the stream of feed fluid, and
  (2) as a first fluidic product, a stream of feed fluid having selectively removed therefrom the at least one selectively adsorbed fluidic component;
(e) second conduit means for providing a secondary fluid stream;
(f) third conduit means from said first separation means for introducing the separated adsorbent powder of (d)(1) into the secondary fluid stream for entraining the separating adsorbent powder in the secondary fluid stream;
(g) fourth conduit means for dispensing from the first separation means the first fluidic product of (d)(2);
(h) first heating means for heating the adsorbent powder in the secondary fluid stream to a third temperature higher than said second temperature for desorbing and releasing from the adsorbent powder the at least one selectively adsorbed fluidic component for providing:
  (1) unloaded adsorbent powder, and
  (2) as a second fluidic product, a stream of the secondary fluid containing the at least one selectively adsorbed/desorbed fluidic component from the feed fluid stream; and
(i) second separation means for separating the unloaded adsorbent powder from (h)(1) from the second fluidic product of (h)(2);
(j) fifth conduit means for dispensing from the second separation means the second fluidic product.

The process and system of this invention can be for the separation of at least one fluidic, i.e., gaseous or liquid, component from a stream of feed fluid (gas or liquid) and may be either a single stage process and system or a multiple stage process and system of two or more separation units.

BRIEF DESCRIPTION OF THE DRAWINGS

This invention is illustrated by, but not limited to, the following drawings in which.

DETAILED DESCRIPTION AND PREFERRED EMBODIMENTS

Figure 1:
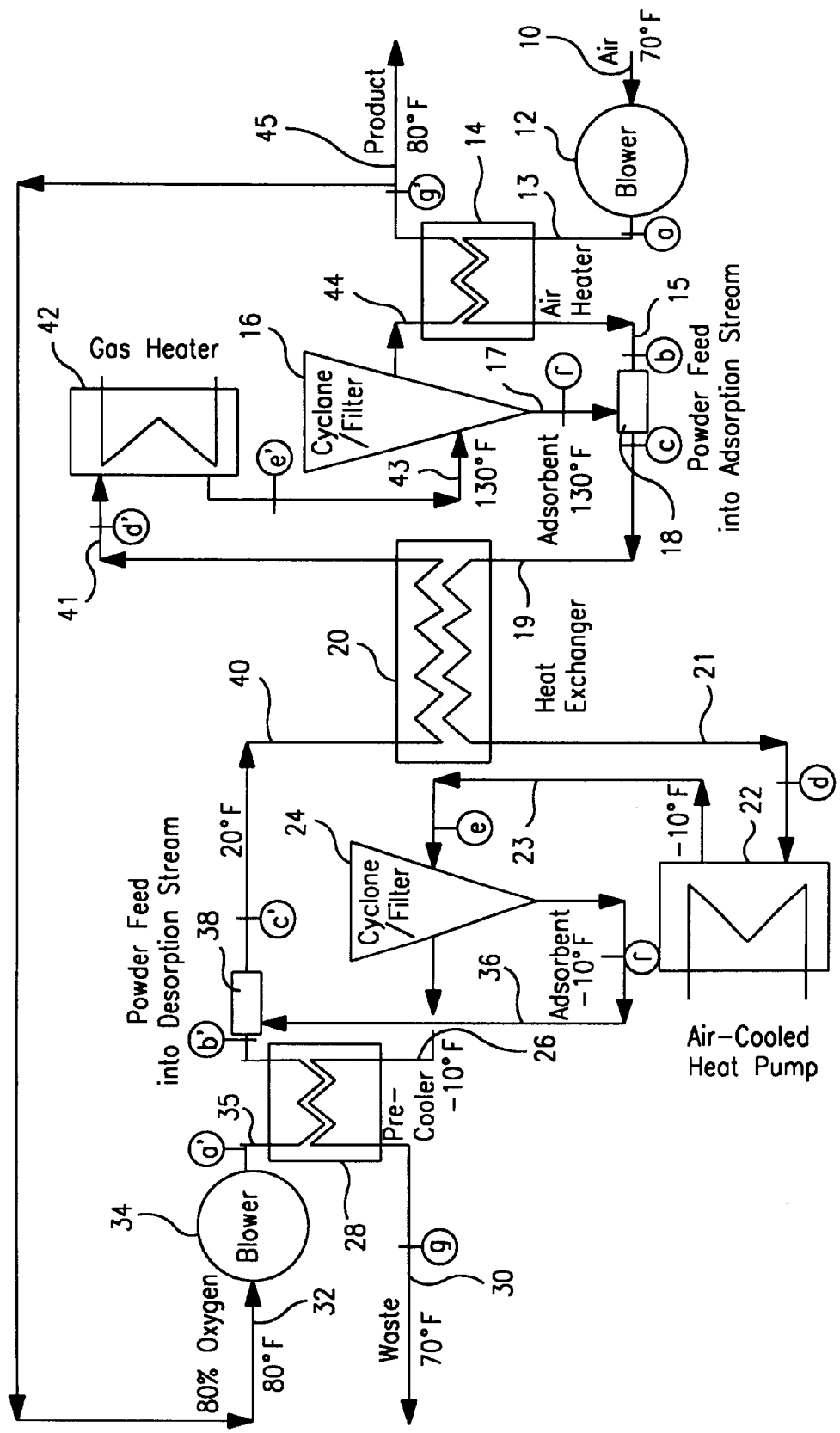
FIG. 1 is a schematic illustration of a TSA process and system for separation of oxygen from air according to the invention.

The process of this invention is characterized by the use of selective adsorbent powder entrained and suspended in a stream of feed gas containing a plurality of gaseous components. The process utilizes selective adsorbents in the form of powder capable of being entrained and suspended in a flowing stream of feed gas. The process will generally utilize selective adsorbents in the form of powders having a particle size (e.g., diameter) of less than about 500 microns, generally less than about 100 microns, and preferably less than about 10 microns, and more preferably of a size of about 1 to about 4 microns. The selective adsorbent powder is entrained and suspended in the feed gas and is transported at a transport velocity of the gas above the entrainment (saltation) velocity of the powder. The transport velocity of the gas and powder will generally range from about 5 to about 60 fps, preferably from about 10 to about 30 fps.

These small size powder particles of selective adsorbent improve the heat and mass transfer of the adsorbent compared to the heat and mass transfer of the larger sized (1 to 4 mm diameter) particles utilized in stationary or moving bed processes and thereby lead to lower operational costs, that in some cases may be a small fraction of the operational cost of a prior art process.

The process and system of this invention can utilize waste thermal energy from an existing plant and thereby reduce the operational cost of the process and system of this invention to an even lower cost level.

In addition, the process and system of this invention, utilizing adsorbent powder entrained and suspended in the feed gas, and the waste thermal energy, can exhibit a faster temperature response, and provide more flexibility in design and operation of the system with continuous on-line steady operation and production of product. The process and system also permit much lower use of adsorbent per tons per day (TPD) of product production. For example, in a $CO_2$ TSA process, this invention uses only about 17 to a maximum of about 45 lbs adsorbent per TPD of production, much less than the quantity of adsorbent particles required for use in a corresponding PSA conventional prior art process and system. Also, the power consumption for operation of a $CO_2$ TSA process of the invention is about two-thirds that required for operation of a corresponding PSA conventional prior art process and system and will generally be about 5.0 kW per TPD of production.

In the adsorbent powder process of this invention, the micron-sized particles of adsorbent powder have little inertia and will move with the gas flow, greatly reducing any adsorbent attrition problem. Thus, the plant or system can run with lower inventory of adsorbent. The requirement for lower inventory of adsorbent and the possible continuous operation of the system means that the plant can be expected to be smaller in size than prior art plants.

The temperature levels for the entrained adsorbent powder TSA process of this invention are generally dependent on a number of factors, such as type of adsorbent, purity of product, fuel gas composition and the like, and will generally range from about 90° F. to about 700° F. (30°–371° C.), more generally from about 130° F. to about 700° F. (54°–371° C.) and may range from about 250° F. to about 700° F. (121°–371° C.). In the corresponding entrained adsorbent powder PSA process of this invention, the high pressure used for adsorption or loading will generally range from about 50 to about 500 psia, preferably from about 150 to about 200 psia, and the desorption or unloading pressure may range from about 1 to about 46 psia, preferably from about 1 to about 10 psia.

In the TSA entrained adsorbent powder process of the invention, the adsorbent powder is used to capture the selected gaseous component of a gas stream. The powder is entrained into the feed gas stream and the gaseous mixture is cooled to enhance the adsorption process by removing the heat of adsorption. The mixture is passed through a separator, such as a cyclone or a filter, to separate the adsorbent powder, which now carries the selected gaseous component. Then, the powder is entrained into a secondary gas stream of product gas. In this stream, the adsorbent powder is heated to desorb and release the adsorbed gaseous component. The desorbed powder is separated from the product gas and then the desorbed or unloaded adsorbent powder is re-entrained back into the feed gas stream for re-adsorption.

FIG. 1 schematically illustrates an idealized TSA process and system using the entrained adsorbent powder process of this invention. The process and system is illustrated for a process of selectively removing high purity oxygen of at least about 80% purity, preferably at least about 90% purity, from a stream of air as the feed gas. This idealized process and system comprises mainly two blowers, two feeders, two cyclones or filters, two heat exchangers (a precooler and an air heater), one suspension heat exchanger, one gas heater and one air-cooled heat pump. For high temperature adsorbent applications, the air-cooled heat pump can be replaced with an air-cooled fin-fan heat exchanger. The air heater and precooler heat exchanger enable the process to release first and second streams of product gases at or near ambient temperatures, which enable further reduction in the energy consumption of the process. Although a specific idealized system is illustrated in FIG. 1, it is possible to modify the system for a process with a specific adsorbent powder by changing approach temperature and/or eliminating unnecessary heat exchanges. FIG. 1 illustrates the process and system utilized with an oxygen selective adsorbent powder, with air as the feed gas, purified oxygen gas as the second gaseous product and waste gas, the first gaseous product.

In the process and system illustrated in FIG. 1, a feed stream of air in a line 10 at a temperature of about 70° F. (21° C.) and at a flow rate of about 20 to 40 fps enters the system (point a) through a blower 12 via line 13 and is heated to about 120° F. (49° C.) by passage through an air heater 14 (point b). Then, unloaded adsorbent powder is dispensed via line 17 from cyclone or filter separator 16 (point f) and introduced via line 17 and feeder 18 into the line 15 of heated air to entrain or suspend the adsorbent powder in the air stream (point c). The mixture of entrained adsorbent powder in the air stream is passed via line 19 through a suspension heat exchanger 20 for removal of heat of adsorption and cooling of the adsorbent powder (point d).

The cooled suspension is then passed via line 21 through an air-cooled heat pump 22 for a final heat removal (point e) by cooling to a temperature of about −10° F. (−23° C.). At this stage of the process most of the oxygen in the stream of air is adsorbed by the entrained adsorbent powder. The cooled suspension is directed via line 23 to a cyclone or filter separator 24 where loaded adsorbent powder (loaded with oxygen gas) is separated from the air stream from which oxygen gas has been selectively adsorbed, i.e., from the gaseous waste product. The gaseous waste product is directed from the separator 24 via line 26 to pre-cooler heat exchanger 28 and is discharged therefrom (point g) via line 30 as gaseous waste product at a temperature of about 70° F. (21° C.).

A secondary gas stream of about 80% oxygen at a temperature of about 80° F. (27° C.) is provided via line 32 and blower 34 (point a') and directed via line 35 through pre-cooler heat exchanger 28 (point b') where it is cooled by heat exchange with the gaseous waste product entering exchanger 28 via line 26. The loaded adsorbent powder separated in separator 24 is delivered via line 36 to a feeder 38 where the loaded adsorbent powder is introduced and entrained in the secondary gas stream (point c') where oxygen is desorbed from the adsorbent powder and the mixture becomes cooled to a temperature of about 20° F. (−7° C.).

The suspension of adsorbent powder in the secondary gas stream is directed via line 40 through suspension heat exchanger 20 where it is heated by heat exchange with the mixture of feed gas and entrained adsorbent powder fed to exchanger 20 via line 19 (point d'). The heated mixture of adsorbent powder entrained in the secondary gas stream is directed via line 41 through gas heater 42 where it is further heated to a temperature of about 130° F. (54° C.) for further or ultimate removal of the oxygen gas from the adsorbent powder (point e'). The heated mixture is passed via line 43 into cyclone or filter separator 16 where unloaded adsorbent powder is separated from the purified oxygen gas product. The separated purified oxygen gas product (generally oxygen gas of at least about 80% oxygen purity) is delivered from separator 26 via line 44 for passage through air heater 14 (point g') where it is cooled by heated exchange with the air feed stream entering air heater 14 via line 13. The purified oxygen gas product is cooled to a temperature of about 80° F. (27° C.) and is delivered as product via line 45. A portion of the product gas is withdrawn from line 45 via line 32 to provide the secondary gas stream feed to blower 34.

The entrained adsorbent powder process is attractive, mainly due to its simple design, continuous on-line steady production, use of mainly thermal energy instead of electric power, low inventory of adsorbent, faster response, flexibility in operation, possibility of combined pressure-temperature swing, multi-stage and multi-purpose applications.

The best applications of this process with the available adsorbents are the separation of carbon dioxide from nitrogen, production of dry-clean air, and adsorption of air pollutants from exhaust gases. The method has the potential to do many other separations with better quality adsorbents.

The optimum working temperature and powder/gas ratio is dependent on the type of separation, adsorbent, and could be different in different cases. The maximum powder/gas ratio will be about 15 and the gas velocity should not drop below the entrainment velocity for the adsorbent powder, generally not less than about 10 fps, preferably not less than about 20 fps. The working temperature range is dependent on the type of adsorbent. Some organic adsorbents could not be heated more than 150°–200° F. (65°–93° C.) while inorganic ones can be heated as high as 700° F. (371° C.).

The entrained adsorbent powder process has a potential to be used for many types of gas separation if an efficient adsorber is available. With an efficient adsorber, the process can be used to produce high/low purity oxygen, nitrogen, argon, carbon dioxide, and clean-dry air. Also, it can be used as a prepurifier and as a treatment plant for factory exhaust gases. It can be used in a multi-stage application for very high purity applications. This system is even suitable for multi-purpose separation with a seasonal operation. The process can be used with mixed adsorbents to pick several gaseous components from the gas stream. For example, in a pollution control process, the adsorption of several gaseous compounds including carbon dioxide, sulfur and nitrogen oxides can be achieved simultaneously if a mixture of adsorbents is used.

Figure 2:
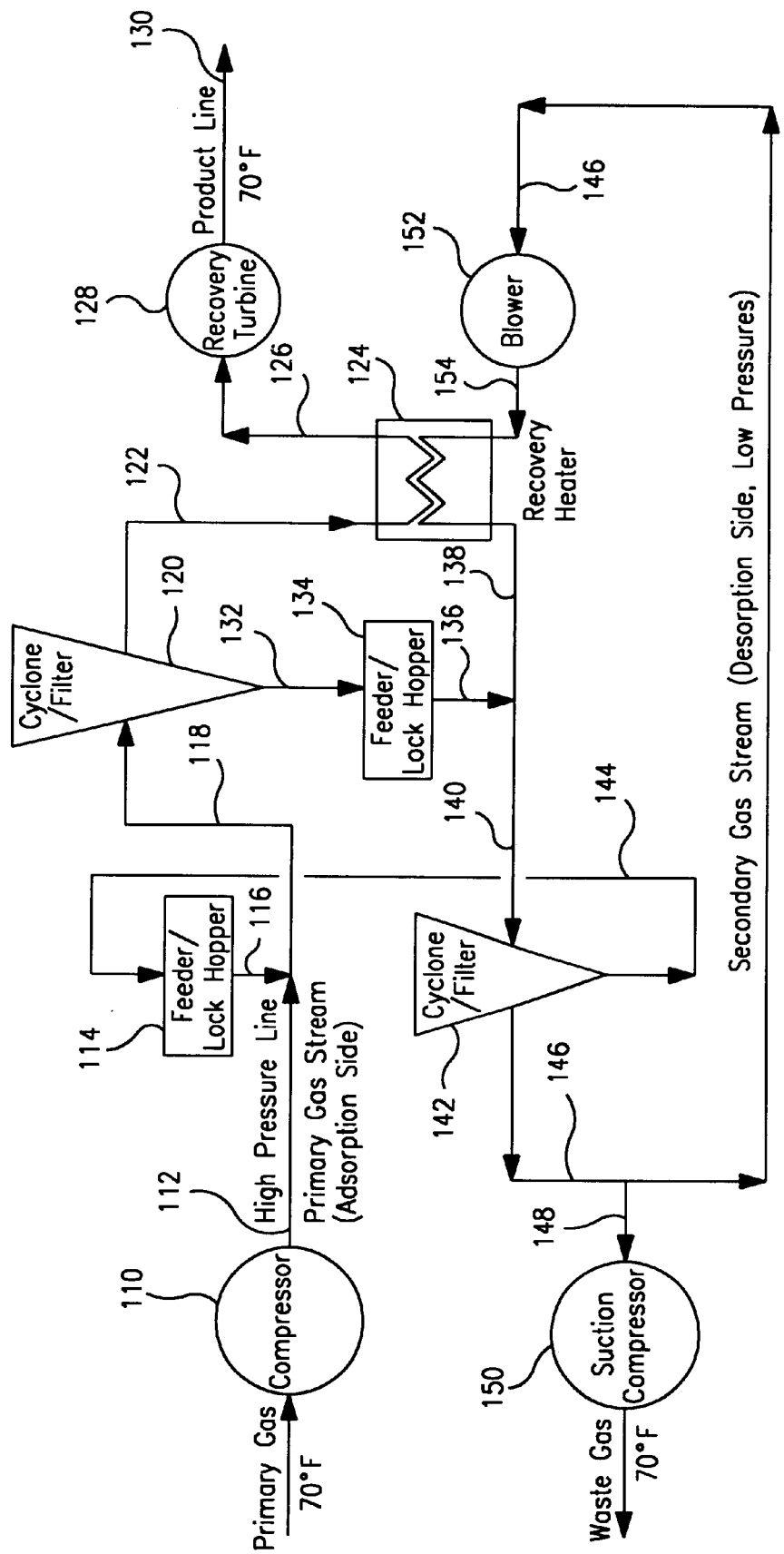
FIG. 2 is a schematic illustration of a PSA process and system for selectively separating waste gas from a primary gas stream in accordance with this invention.

FIG. 2 illustrates a process and system of this invention using PSA for adsorption of waste gaseous product from a primary gas feed stream and for producing product gas purified of waste gas. Primary gas is supplied at about 70° F. (21° C.) and high pressure by compressor 110 as a gas stream into line 112. Selective, unloaded adsorbent powder is dispensed from feeder/lock hopper 114 as feed via line 116 into the primary gas stream in line 112 where the adsorbent powder is entrained, suspended and selectively adsorbs waste components present in the primary gas stream. The powder is then passed via line 118 into cyclone or filter separator 120 where adsorbent powder loaded with waste gases is separated from product gas from which waste contaminants have been selectively removed. Product gas is delivered from separator 120 via line 122 to recovery heater 124 and from there through line 126 to power recovery turbine 128 before being dispensed via line 130 as purified product gas at a temperature of about 70° F. (21° C.).

The adsorbent powder loaded with waste components separated in separator 120 is dispensed via line 132 to a feeder/lock hopper 134 for feeding via line 136 into a low pressure, secondary gas stream in line 138 under vacuum. There the loaded adsorbent powders are entrained and suspended and adsorbed waste gas is desorbed or unloaded from the adsorbent powders. The suspended mixture is then fed via line 140 to cyclone or filter separator 142 for separation of the unloaded adsorbent powder and waste gas components. The unloaded adsorbent powder is delivered from separator 142 via line 144 to feeder/lock hopper 114. The separated waste gas is delivered from separator 142 via lines 146 and 148 by means of suction compressor 150 as waste gas at a temperature of about 70° F. (21° C.). A portion of the waste gas in line 146 is recycled through blower 152, line 154, and after passage through recovery heater 124 is provided as the secondary gas stream in line 138. The system is characterized by a single heat exchanger, which is recovery heater 124 to receive heat from the product gas in line 122.

Figure 3:
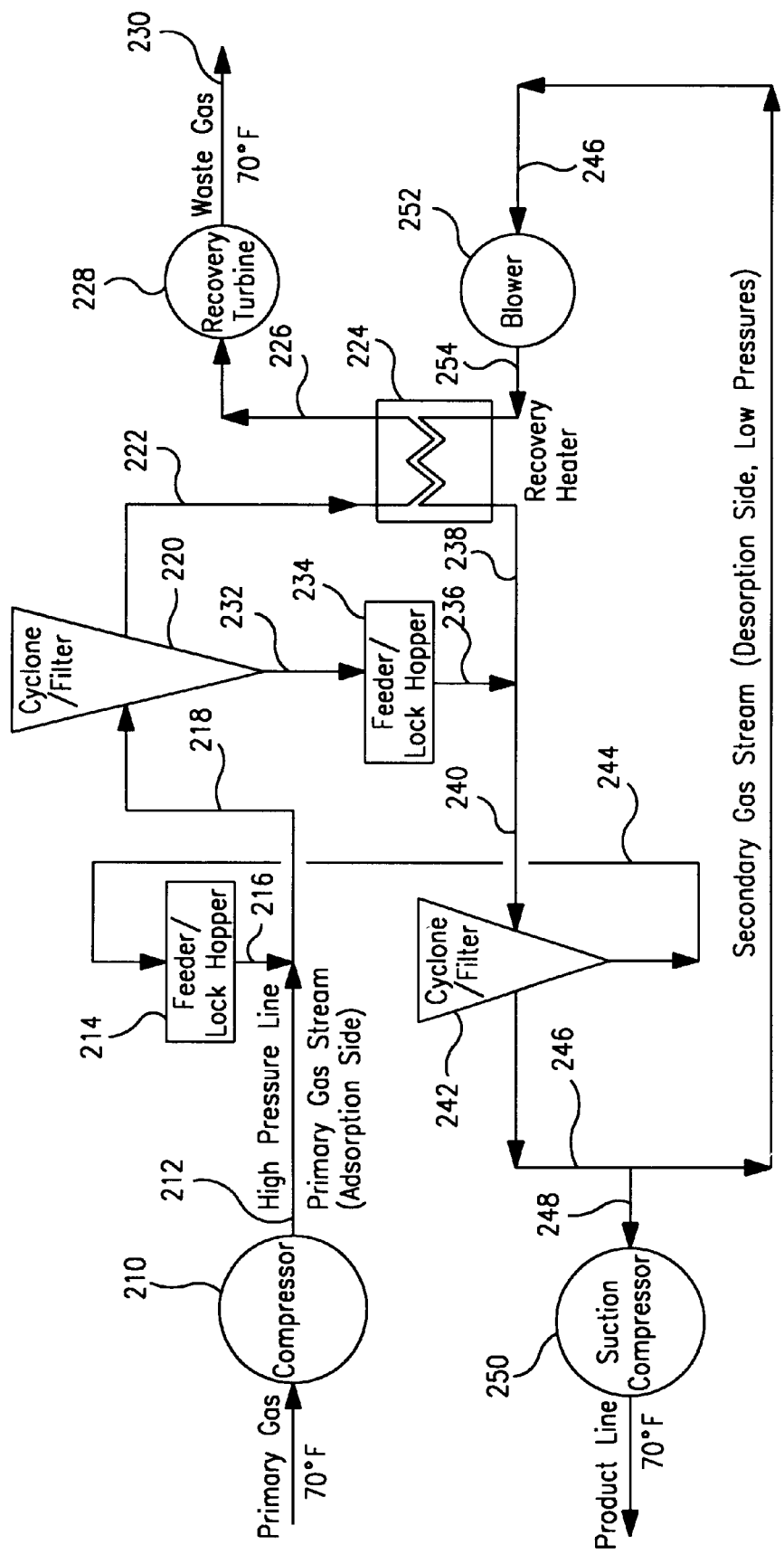
FIG. 3 is a schematic illustration of a PSA process and system for selectively separating a product gas from a primary gas stream in accordance with this invention.

FIG. 3 illustrates the same PSA system of FIG. 2, but where selective adsorbent powder is employed which selectively adsorbs product gas from a primary gas stream. Primary gas is supplied as a gas stream at about 70° F. (21°

C.) and high pressure by compressor 210 into line 212. Selective unloaded adsorbent powder is dispensed from feeder/lock hopper 214 as feed via line 216 into the primary gas stream in line 212 where the adsorbent powder is entrained and suspended and selectively adsorbs waste components present in the primary gas stream and is passed via line 218 into cyclone or filter separator 220 where adsorbent powder loaded with product gases is separated from waste gas from which waste contaminants have been selectively removed. Waste gas is delivered from separator 220 via line 222 to recovery heater 224 and from there through line 226 to power recovery turbine 228 before being dispensed via line 230 as purified waste gas at a temperature of about 70° F. (21° C.)

The adsorbent powder loaded with waste components separated in separator 220 is dispensed via line 232 to a feeder/lock hopper 234 for feeding via line 236 into a low pressure, secondary gas stream in line 238 under vacuum where the loaded adsorbent powders are entrained and suspended and adsorbed product gas is desorbed or unloaded from the adsorbent powders. The suspended mixture is then fed via line 240 to cyclone or filter separator 242 for separation of the unloaded adsorbent powder and product gas components. The unloaded adsorbent powder is delivered from separator 242 via line 244 to feeder/lock hopper 214. The separated product gas is delivered from separator 242 via lines 246 and 248 by means of suction compressor 250 as product gas at a temperature of about 70° F. (21° C.). A portion of the product gas in line 246 is recycled through blower 252, line 254, and after passage through recovery heater 224 is provided as the secondary gas stream in line 238. The system is characterized by a single heat exchanger, which is recovery heater 224 to receive heat from the waste gas in line 222.

Figure 4:
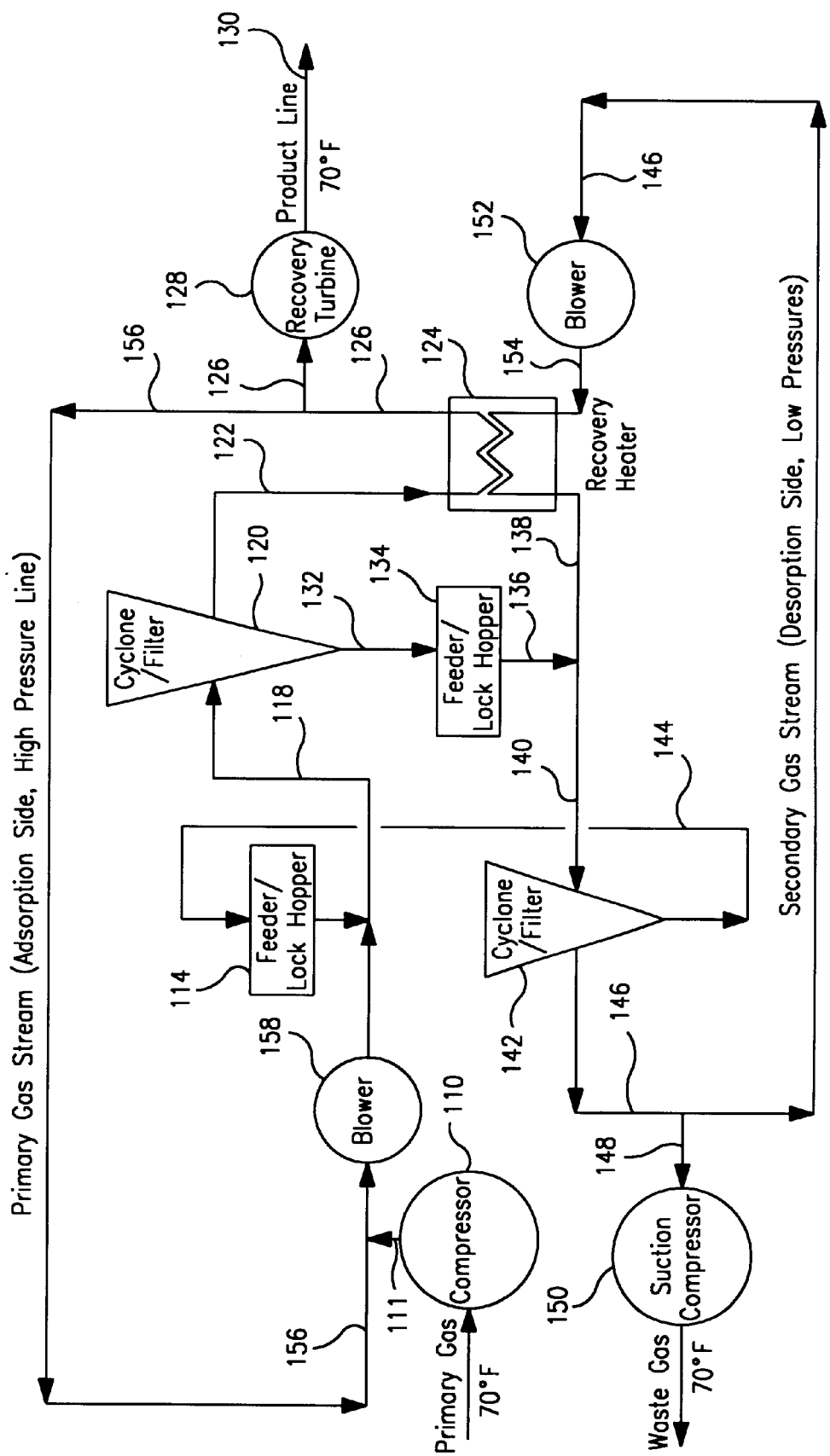
FIG. 4 is a schematic illustration of an enhanced PSA process and system for selectively separating waste gas from a primary gas stream in accordance with this invention.

FIG. 4 illustrates an enhanced process and system of FIG. 2 using PSA for adsorption of waste gaseous products from a primary gas feed stream. The enhancements of the process and systems of FIG. 2 illustrated in FIG. 4 uses a recirculating product gas to increase the concentration of product gas. Similar reference numerals refer to the same elements as the reference numerals in FIG. 2. The enhancement comprises recycling a portion of the product gas in line 126 via line 156 to mix with primary gas from compressor 110 via line 111 and be delivered by blower 158 to line 112 for entrainment of unloaded adsorbent powder therein.

Figure 5:
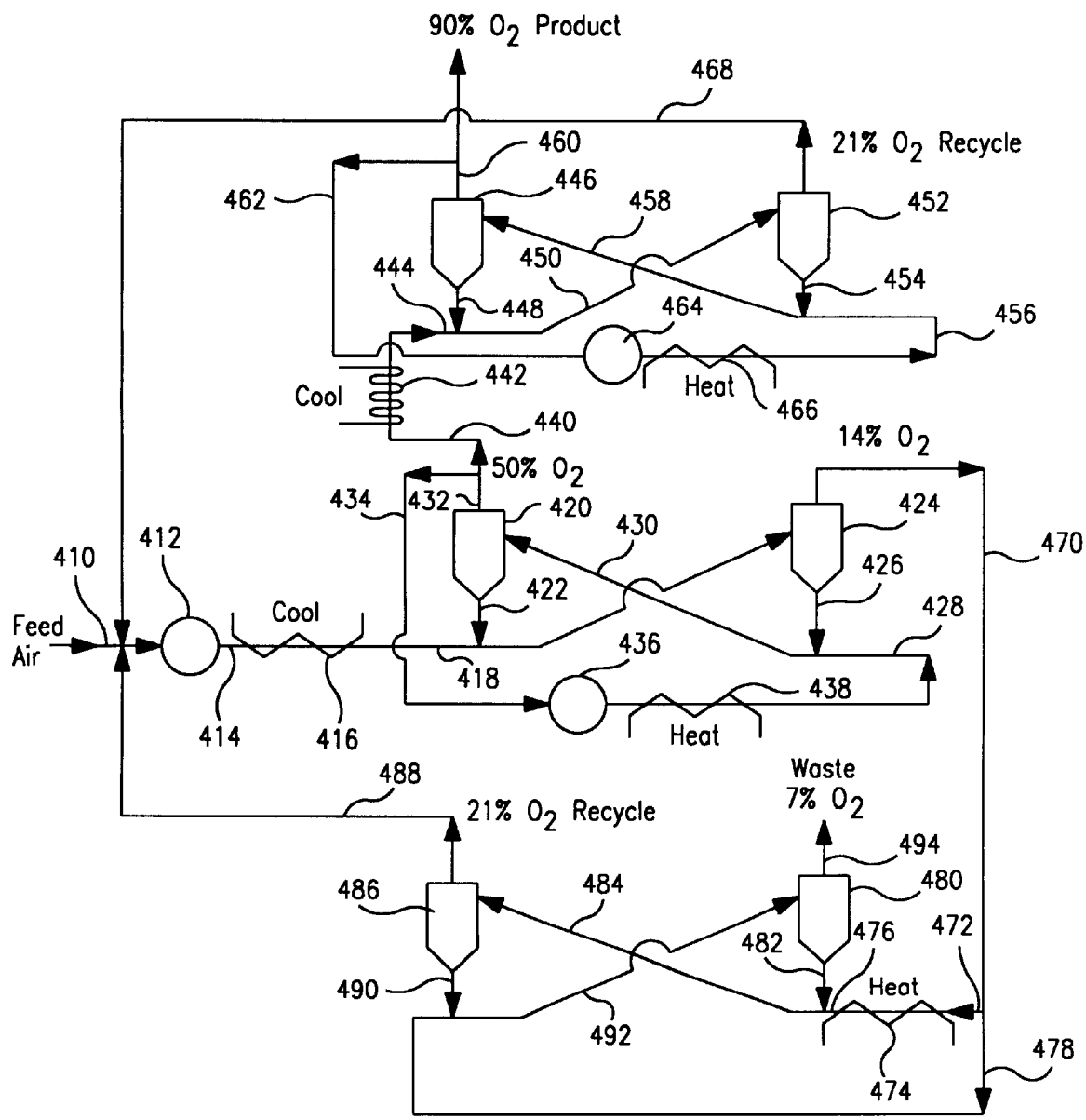
FIG. 5 is a schematic illustration of a multistage process and system of this invention for selectively separating high purity oxygen from an air feed stream.

FIG. 5 illustrates a multi-stage process and system of this invention utilized for the separation of high purity oxygen from a feed stream of air. For clarity of illustrating the multi-stage aspect of the process and system, the drawings have been simplified and reduced in detail. A stream of feed air is provided via line 410 through blower 412 and line 414 to cooler 416 where it is cooled and supplied to line 418. In line 418 unloaded adsorbent powder from cyclone separation 420 is supplied via line 422 to line 418 and entrained and suspended in the cooled feed air to adsorb oxygen gas therefrom. Line 418 feeds the suspended mixture of entrained adsorbent powder and air to cyclone separator 424 where adsorbent powder loaded with oxygen gas is separated from air now containing about 14% oxygen. The separated loaded adsorbent powder is dispensed from cyclone 424 via line 426 into a heated secondary gas stream in line 428 and oxygen is desorbed from the loaded adsorbent powder. This mixture is supplied via line 430 to cyclone separator 420 for separation of the purified oxygen gas (about 50% oxygen) from the unloaded adsorbent powder.

The 50% purity oxygen gas is transported from separator 420 via line 432 and a portion of the purified oxygen gas is recycled via line 434 through blower 436 and heater 438 to provide the heated secondary gas stream in line 428. The unrecycled portion of the purified oxygen gas is passed via line 440 through cooler 442 into line 444 where separated unloaded adsorbent powder from cyclone 446 is introduced via line 448 and is entrained in the purified oxygen gas stream to adsorb oxygen gas therefrom. This mixture is supplied via line 450 to cyclone separator 452 where separation occurs of loaded adsorbent powder and secondary gas (21% oxygen) from which oxygen gas has been selectively separated. The loaded adsorbent from separator 452 is supplied via line 454 to and entrained in heated tertiary gas stream in line 456 where oxygen gas is desorbed from the adsorbent powder. The mixture is supplied via line 458 to separator 446 where separation of unloaded adsorbent and high purity (90%) oxygen gas occurs.

The high purity oxygen gas is withdrawn from separator 446 as product gas. A portion of the product gas is recycled from line 460 via line 462 through blower 464 and heater 466 to provide the heated tertiary gas stream in line 456. The 21% oxygen gas separated from loaded adsorbent powder in separator 452 is recycled via line 468 to line 410 to provide a portion of the feed gas for the process and system. The 14% oxygen gas separated from loaded adsorbent powder in separator 424 is supplied via line 470 from which a portion is supplied via line 472 to heater 474, where it is heated to provide a heated quaternary gas stream in line 476 and the remaining portion is cooled as a fifth gas stream in line 478.

Loaded adsorbent powder is provided from cyclone separator 480 via line 482 to be entrained in the heated quaternary gas stream in line 476 to desorb oxygen gas therefrom. This mixture is supplied via line 484 to cyclone separator 486 for separation of unloaded adsorbent from increased purity oxygen gas (21% oxygen). The increased purity oxygen gas stream is recycled by line 488 to mix with the incoming air of the primary gas stream. The separated unloaded adsorbent from separator 486 is recycled via line 490 into and is entrained with the cooled fifth gas stream in line 478 for adsorption of oxygen gas therefrom. This mixture is sent to cyclone separator 480 via line 492 for separation of waste gas (7% oxygen) and loaded adsorbent powder. The waste gas is withdrawn from the system via line 494 and as mentioned hereinbefore loaded adsorbent from cyclone separator 480 is provided via line 482 to the heated quaterary gas stream in line 476. Such multi-staging of the system units and separators as shown in FIG. 5 can be utilized to increase both purity and recovery of product gas.

The process and system of the invention can be used for a wide variety of fluid and/or gas separations and purifications, including but not limited to separations in chemical plants, paper mills, water and sewage treatment plants, pollution control facilities, and power plants in removing impurities and hydrocarbons from drinking water, purification of chemicals, separation of mixed chemicals, and all other water/sewage treatments including ion-exchange. In pollution control, exhaust gases which contain several air pollutants may not be able to be purified by a single adsorbent. For example, exhaust gas with, for example, $CO_2$, $SO_x$, $NO_x$ and ozone at different concentrations may require that the selective adsorbent powder to be utilized in the process and system of this invention comprise a mixture of several adsorbent powders mixed in the right proportion to carry out an effective separation and purification of the exhaust gas.

The following are examples of separation and/or purification processes, which may be conducted with the process and system of this invention.

Production of High Purity Oxygen and Nitrogen

Oxygen selective adsorbents are the best candidates for this type of operation. For an organic adsorbent, typical working temperatures for hot and cold sides of the process are 130° and −10° F. (54° and −23° C.), respectively. The oxygen with a purity of about 80% will be produced on the hot side of the process while nitrogen with a purity of about 87% will be discharged from the cold side into ambient. A higher cold side pressure and a lower cold side temperature will increase the loading of the adsorbent while it will decrease the selectivity of the adsorption. An on-line operational control could be maintained to achieve the optimum production.

Production of Lower Purity Oxygen, High Purity Nitrogen and Argon

Nitrogen selective adsorbents are the best adsorbent powders for this type of process. Typical working temperatures for hot and cold sides of the process are 300° F. and 10° F. (149° C. and −12° C.), respectively. Low concentration oxygen with a purity of about 30% would be produced on the cold side. The hot side would have 92% nitrogen, which will be released into ambient. For Argon production, the same type of adsorbent is recommended using a combined pressure and temperature swing. This will increase the loading of the powder with a decreased selectivity. Therefore, both oxygen and nitrogen would be picked up and transferred to the hot side of the plant. The cold side would be Ar as the product. A multi-stage might be used to separate all oxygen and nitrogen gases from the Argon.

Production of Carbon Dioxide $CO_2$ selective adsorbents are the best adsorbent powders for this type of process. Typical working temperatures for hot and cold sides of the process are 500° F. and 70° F. (260° C. and 21° C.), respectively. Feed stream will be on the cold side and would contain about 12–30% carbon dioxide. The product will be on the hot side of process with a concentration as high as about 92% carbon dioxide.

Application of TSA Powder Process as a Prepurifier

This type of plant would reduce water and carbon dioxide of the air to a permissible limit. For example, water content of air of about 12000 ppm could be lowered to about 0.2 ppm. On the other hand, carbon dioxide content of about 350 ppm could be reduced to about 0.2 ppm. The selected adsorbent is 13X with a 70° F. (21° C.) cold side and 700° F. (371° C.) hot side temperature and a pressure of 90 psia for cold side.

Production of Clean-Dry Air

This type of plant would reduce water content of the air from about 1450–8540 ppm to a permissible 0.5–20 ppm limit. The selected adsorbent is 13X with a 70° F. (21° C.) cold and 300° F. (149° C.) hot side temperature under high pressure.

Air Pollution Control (Removal of $CO_2$, $SO_x$ and $NO_x$ from Exhaust gases)

This type of plant would remove all pollutants from the exhaust gases before releasing them into atmosphere. This will help to prevent global warming in addition to lower acid rain, and air pollution. The adsorbent powder is entrained into the exhaust gases, which would be passed through an air cooled heat exchanger. The powder will be separated in a cyclone and entrained into a secondary stream for desorption. The selected adsorbent is 13X with a 70° F. (21° C.) cold and 700° F. (371° C.) hot side temperature under atmospheric pressure. The process was shown to be feasible and lowered the concentration Of $CO_2$ from 11% to 0.34%, $SO_x$ from 2024 ppm to 1.9 ppm, $NO_x$ from 483 ppm to 0.2 ppm in accordance to EPA standards. The released gas would contain mainly 95.6% nitrogen and 4.1% oxygen and argon. These pollutants could be possibly captured by lime in a bubbling pond.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A process for selectively removing from a feed fluid at least one of a plurality of fluidic components present in a stream of feed fluid, the process comprising:
   (a) providing the stream of feed fluid at a first temperature;
   (b) providing unloaded selective adsorbent powder and entraining said adsorbent powder in the stream of feed fluid to provide a mixture of adsorbent powder suspended in the stream of feed fluid, said selective adsorbent powder adapted to selectively adsorb at least one of the plurality of fluidic components from the stream of feed fluid;
   (c) cooling the mixture of the adsorbent suspended in the stream of feed fluid to a lower second temperature whereby said selective adsorbent powder selectively adsorbs the at least one of the plurality of fluidic components from the stream of feed fluid;
   (d) separating the adsorbent powder from the cooled suspension of adsorbent in the stream of feed fluid to provide:
      (1) separated adsorbent powder having adsorbed thereon the at least one selectively adsorbed fluidic component from the stream of feed fluid, and
      (2) as a first fluidic product, a stream of feed fluid having selectively removed therefrom the at least one selectively adsorbed fluidic component;
   (e) providing a secondary fluid stream and introducing the separated adsorbent powder of (d)(1) into the secondary fluid stream;
   (f) heating the separated adsorbent powder in the secondary fluid stream to a third temperature higher than said second temperature to desorb and release from the adsorbent powder the at least one selectively adsorbed fluidic component to provide:
      (1) unloaded adsorbent powder, and
      (2) as a second fluidic product, a stream of the secondary fluid containing the at least one selectively adsorbed/desorbed fluidic component from the feed fluid stream; and
   (g) separating the unloaded adsorbent powder of (f)(1) from the second fluidic product of (f)(2).

2. A process according to claim 1, which is a continuous process and wherein the secondary fluid stream of step (e) comprises a recycled portion of the second fluidic product separated in step (g).

3. A process according to claim 2, wherein the unloaded adsorbent powder of (f)(1) is recycled to provide at least a portion of the unloaded adsorbent powder of step (b).

4. A process according to claim 1, wherein the feed fluid is air, the second fluidic product of (f)(2) comprises gaseous oxygen of at least about 30% purity.

5. A process according to claim 1, wherein the third temperature of step (f) comprises a temperature within the range of from about 90° F. to about 700° F. (32° C.–371° C.).

6. A process according to claim 1, wherein the adsorbent powder has a powder size of about 10 microns or less.

7. A process according to claim 1, wherein the stream of feed fluid is a gas supplied at a transport velocity of about 10 to about 30 fps.

8. A process according to claim 1, wherein the stream of feed fluid provided in step (a) is heated by passing the stream of feed fluid through a first heat exchange means; the mixture of adsorbent powder suspended in the stream of feed fluid is passed through a second heat exchange means for removal of heat of adsorption and cooling of the adsorbent powder, and then passed through a first cooling means to cool the mixture to the lower second temperature; the separation of the adsorbent powder from the cooled suspension of adsorbent powder in the stream of feed fluid in step (d) occurs in a first cyclone means; the first fluidic product of (d)(2) is cooled by passing through a third heat exchange means; the unloaded adsorbent powder of (f)(1) is recycled to provide at least a portion of the unloaded adsorbent powder of step (b); the secondary fluid provided in step (e) is passed through the third heat exchange means before being mixed with the separated adsorbent powder of (d)(1); the heating of the adsorbent powder in the secondary fluid stream in step (f) occurs by passing through the second heat exchange means and then passing the adsorbent powder in the secondary fluid stream through a heating means to heat it to the third temperature; the separation of the unloaded adsorbent powder of (f)(1) from the second fluidic product of step (2) occurs in second cyclone means; and the separated second fluidic product is passed through the first heat exchange means to cool the second fluidic product.

9. A process according to claim 8, wherein the stream of feed fluid is a gas supplied at a transport velocity of about 10 to about 30 fps.

10. A process according to claim 1 comprising a multi-stage process wherein steps (a) through (g) are repeated in a second stage as steps (a') through (g') and the second fluidic product of step (g) comprises the stream of feed fluid for step (a').

11. A process for selectively removing from a feed fluid at least one of a plurality of fluidic components present in a stream of feed fluid, the process comprising:
   (a) providing the stream of feed fluid;
   (b) providing unloaded selective adsorbent powder and entraining said adsorbent powder in the stream of feed fluid to provide a mixture of adsorbent powder suspended in the stream of feed fluid, said selective adsorbent powder adapted to selectively adsorb at least one of the plurality of fluidic components from the stream of feed fluid;
   (c) placing the mixture of the adsorbent powder suspended in the stream of feed fluid under an elevated pressure whereby said selective adsorbent powder selectively adsorbs the at least one of the plurality of fluidic components from the stream of feed fluid;
   (d) separating the adsorbent powder from the suspension of adsorbent in the stream of feed fluid to provide:
      (1) separated adsorbent powder having adsorbed thereon the at least one selectively adsorbed fluidic component from the stream of feed fluid, and
      (2) as a first fluidic product, a stream of feed fluid having selectively removed therefrom the at least one selectively adsorbed fluidic component;
   (e) providing a secondary fluid stream and introducing the separated adsorbent powder of (d)(1) into the secondary fluid stream;
   (f) placing the separated adsorbent powder in the secondary fluid stream under a reduced pressure to desorb and release from the adsorbent powder the at least one selectively adsorbed fluidic component to provide:
      (1) unloaded adsorbent powder, and
      (2) as a second fluidic product, a stream of the secondary fluid containing the at least one selectively adsorbed/desorbed fluidic component from the feed fluid stream; and
   (g) separating the unloaded adsorbent powder of (f)(1) from the second fluidic product of (f)(2).

12. A process according to claim 11, which is a continuous process and wherein the secondary fluid stream of step (e) is a recycled portion of the second fluidic product separated in step (g).

13. A process according to claim 12, wherein the unloaded adsorbent powder of (f)(1) is recycled to provide at least a portion of the unloaded adsorbent powder of step (b).

14. A process according to claim 11, wherein the adsorbent powder has a powder size of about 10 microns or less.

15. A process according to claim 11, wherein the stream of feed fluid provided in step (a) is provided at a first temperature, step (c) is conducted at a second temperature which is lower than the first temperature, and step (f) is conducted at a third temperature which is higher than the second temperature.

16. A separation system for selectively removing from a feed fluid at least one of a plurality of fluidic components present in a stream of feed fluid, the separation system comprising:
   (a) first conduit means for providing the stream of feed fluid at a first temperature;
   (b) at least a first dispensing means for providing and dispensing unloaded selective adsorbent powder into the first conduit means for entraining said adsorbent powder in the stream of feed fluid for providing a mixture of adsorbent powder suspended in the stream of feed fluid, said selective adsorbent powder adapted to selectively adsorb at least one of the plurality of fluidic components from the stream of feed fluid;
   (c) cooling means for cooling the mixture of the adsorbent powder suspended in the stream of feed fluid to a lower second temperature whereby said selective adsorbent powder can selectively adsorb the at least one of the plurality of fluidic components from the stream of feed fluid;
   (d) first separation means for separating the adsorbent powder from the cooled suspension of adsorbent in the stream of feed fluid for providing:
      (1) separated adsorbent powder having adsorbed thereon the at least one selectively adsorbed fluidic component from the stream of feed fluid, and
      (2) as a first fluidic product, a stream of feed fluid having selectively removed therefrom the at least one selectively adsorbed fluidic component;
   (e) second conduit means for providing a secondary fluid stream;
   (f) third conduit means from said first separation means for introducing the separated adsorbent powder of (d)(1) into the secondary fluid stream for entraining the separating adsorbent powder in the secondary fluid stream;
   (g) fourth conduit means for dispensing from the first separation means the first fluidic product of (d) (2);

(h) first heating means for heating the adsorbent powder in the secondary fluid stream to a third temperature higher than said second temperature for desorbing and releasing from the adsorbent powder the at least one selectively adsorbed fluidic component for providing:
  (1) unloaded adsorbent powder, and
  (2) as a second fluidic product, a stream of the secondary fluid containing the at least one selectively adsorbed/desorbed fluidic component from the feed fluid stream; and
(i) second separation means for separating the unloaded adsorbent powder from (h)(1) from the second fluidic product of (h)(2);
(j) fifth conduit means for dispensing from the second separation means the second fluidic product.

17. A separation system according to claim 16, wherein the cooling means comprises a first heat exchanger and an air-cooled heat pump, a first cyclone comprises both said first dispensing means and a second separation means, a second cyclone comprises both said second dispensing means and said first separation means, and the first heating means comprises the first heat exchanger, and a fluid heater, and the separation system further comprises:

(k) a second heat exchanger for heating the stream of feed fluid before entraining the adsorbent powder therein and for cooling the second fluidic product stream of (h)(2); and (l) a third heat exchanger for cooling the secondary fluid stream before introducing the separated adsorbent powder of (d)(1) therein and for heating the first fluidic product of (d)(2) in the fourth conduit means.

18. The separation system of claim 16, which comprises a gas separating system for the separation of at least one of a plurality of gaseous components from a stream of feed gas.

19. A separation system according to claim 16, which comprises a multistage separation system in which items (a) through (j) comprise the first stage and items identical to items (a) through (j) are also present in a second stage as items (a') through (j') and the fifth conduit of item (j) of the first stage is for dispensing the second fluidic product to the first conduit means of (a') of the second stage as the stream of feed fluid.

* * * * *